US012583710B2

(12) United States Patent
Perälä et al.

(10) Patent No.: US 12,583,710 B2
(45) Date of Patent: Mar. 24, 2026

(54) ELEVATOR CONTROL UNIT AND A METHOD FOR DETERMINING ENERGY AND/OR POWER CONSUMPTION OF AN ELEVATOR

(71) Applicant: KONE Corporation, Helsinki (FI)

(72) Inventors: Pekka Perälä, Helsinki (FI); Pekka Perunka, Helsinki (FI); Juhamatti Nikander, Helsinki (FI); Tapio Tyni, Helsinki (FI)

(73) Assignee: KONE Corporation, Helsinki (FI)

( * ) Notice: Subject to any disclaimer, the term of this patent is extended or adjusted under 35 U.S.C. 154(b) by 1187 days.

(21) Appl. No.: 17/468,849

(22) Filed: Sep. 8, 2021

(65) Prior Publication Data

US 2022/0106156 A1 Apr. 7, 2022

(30) Foreign Application Priority Data

Oct. 6, 2020 (EP) .................................... 20200184

(51) Int. Cl.

*B66B 1/30* (2006.01)
*B66B 1/34* (2006.01)
*B66B 5/00* (2006.01)

(52) U.S. Cl.

CPC ............ *B66B 1/302* (2013.01); *B66B 1/3492* (2013.01); *B66B 5/0037* (2013.01); *B66B 2201/216* (2013.01)

(58) Field of Classification Search

CPC ..... B66B 1/302; B66B 1/3492; B66B 5/0037; B66B 2201/216; B66B 5/0006; B66B 1/06; B66B 11/043; B66B 13/143; H02J 13/00002; H02J 13/00006; H02J 13/00026; H02M 5/4585; H02P 27/06

See application file for complete search history.

(56) References Cited

U.S. PATENT DOCUMENTS

| | | | | |
|---|---|---|---|---|
| 4,402,387 A * | 9/1983 | Tsuji | B66B 1/285 187/293 |
| 2012/0138388 A1 | 6/2012 | Finschi et al. | |
| 2015/0144434 A1* | 5/2015 | Herkel | B66B 1/3407 187/276 |

FOREIGN PATENT DOCUMENTS

| | | |
|---|---|---|
| CN | 111422719 B | 9/2020 |
| WO | WO 2013/176670 A1 | 11/2013 |
| WO | WO 2013/187783 A1 | 12/2013 |

* cited by examiner

*Primary Examiner* — J. T. Newton, Esq.

(74) *Attorney, Agent, or Firm* — Birch, Stewart, Kolasch & Birch, LLP

(57) ABSTRACT

An elevator and a method for determining energy and/or power consumption of an elevator, the elevator comprising a drive system comprising a drive unit for driving an electric motor and an elevator control system for controlling the drive system, wherein at least two different operating states are used for the elevator. The method comprises measuring at least part of power and/or energy consumption of the drive system, at least when the elevator is moving, determining duration which the elevator spends in different operating states of the elevator, and determining energy and/or power consumption of the elevator based at least in part on the measured power and/or energy consumption of the drive system and determined and/or estimated energy and/or power consumption in different operating states of the elevator.

16 Claims, 6 Drawing Sheets

PRIOR ART SOLUTION

ELEVATOR CONTROL UNIT AND A METHOD FOR DETERMINING ENERGY AND/OR POWER CONSUMPTION OF AN ELEVATOR

TECHNICAL FIELD

The invention relates to an elevator control unit and a method for determining energy and/or power consumption of an elevator.

BACKGROUND

The need for energy efficient solutions has increased in the recent years. Therefore, energy monitoring solutions have been developed also for the elevator environment.

The most common current energy monitoring solutions are based on external power measurement devices. The advantages of these solutions are that they are off-the-shelf products and services. That way they can be easily purchased. Also, some of the solutions are also able to provide good accuracy.

However, the currently available energy monitoring solutions for the elevators have also certain disadvantages. One of the problems with these prior art solutions is the high cost, e.g. including hardware cost and installation and configuration costs of the external measurement devices. It's also difficult and time consuming to integrate the measurement devices to elevator systems as there are separate devices. In addition, separate measurement devices are not only needed for the elevator but also for the other equipment such as light supply, etc. This all causes problems and high costs because various separate systems are required and for example all these systems need to be installed and their operation has to be configured. Also increased elevator downtime is caused for these reasons during the installation and maintenance of these separate devices.

Thus, there's a need to improve the current energy monitoring solutions for the elevator environment.

SUMMARY

With the solution of the invention, an energy monitoring solution for elevators and elevator environment can be provided which can achieve good accuracy for the energy and power consumption and which can be easily integrated to the elevator environment and implemented in a cost-effective manner.

According to a first aspect, the invention relates to a method for determining energy and/or power consumption of an elevator, the elevator comprising a drive system comprising a drive unit for driving an electric motor and an elevator control system for controlling the drive system, wherein at least two different operating states are used for the elevator. The method comprises measuring at least part of power and/or energy consumption of the drive system, e.g. drive unit, at least when the elevator, e.g. elevator car, is moving, determining duration which the elevator spends in different operating states of the elevator, and determining energy and/or power consumption of the elevator based at least in part on the measured power and/or energy consumption of the drive system and determined and/or estimated energy and/or power consumption in different operating states of the elevator.

In one embodiment of the invention the power and/or energy consumption of the drive system is measured by a built-in power measurement of the drive unit. The power measurement can be a motor input power measurement, a drive unit input power measurement or a motor input power and elevator control system input power measurement.

In one embodiment of the invention the built-in power measurement of the drive unit comprises at least one of: phase current and voltage measurement means of a 3-phase drive unit input; phase current measurement means of a 3-phase drive unit output supplying the motor and voltage measurement means of a drive unit intermediate DC circuit; phase current measurement means of a 3-phase drive unit output supplying the motor and voltage measurement means of a drive unit intermediate DC circuit and current and/or voltage measurement means of a drive unit output supplying the elevator control system.

In one embodiment of the invention the power and/or energy consumption in different operating states of the elevator is determined and/or estimated at least in part based on a predefined component power demand in each operating state and the time spent in each operating state.

In one embodiment of the invention the operating states comprise at least one of the following: elevator moving, elevator door moving, elevator in idle, elevator in standby.

In one embodiment of the invention energy and/or power consumption of at least one of the following components is taken into account when determining energy and/or power consumption in different operating states of the elevator: energy and/or power consumption of the elevator control system, energy and/or power consumption of an elevator car light circuit, energy and/or power consumption of an elevator shaft light circuit, energy and/or power consumption of shaft signalization, energy and/or power consumption of a fan and/or an air conditioning system of the elevator car, energy and/or power consumption of a door operator, energy and/or power consumption of the drive system internal power, such as the power and/or energy consumption of the drive unit and a drive unit controller.

In one embodiment of the invention the drive system energy and/or power consumption is measured also when the elevator, e.g. elevator car, is not moving, i.e. it is in standstill.

In one embodiment of the invention the drive system energy and/or power consumption is determined when the elevator, e.g. elevator car, is at a standstill based on a predefined power demand of the drive system. Then the determination of energy and/or power consumption of the elevator is based on the determined energy and/or power consumption of the drive system and determined and/or estimated energy and/or power consumption in different operating states of the elevator.

In one embodiment of the invention the power and/or energy consumption of the elevator is determined at least in one of the following: in the drive system, in the elevator control system, in a separate local computing device and/or in an external server or service, such as a cloud service.

According to a second aspect, the invention relates to an elevator control system for controlling a drive system comprising a drive unit for driving an electric motor of an elevator, wherein the elevator control system is configured to use at least two different operating states for the elevator. The elevator control system is configured to determine power and/or energy consumption of the drive system, e.g. drive unit, at least when the elevator is moving, determine duration which the elevator spends in each operating state of the elevator, and determine energy and/or power consumption of the elevator based at least in part on measured and/or determined power and/or energy consumption of the drive system and determined and/or estimated power and/or energy consumption in different operating states of the elevator.

In one embodiment of the invention the elevator control system is configured to determine the power and/or energy consumption of the drive system by a built-in power measurement of the drive unit, wherein the power measurement is motor input power measurement or drive unit input power measurement or motor input power and elevator control system input power measurement.

In one embodiment of the invention the elevator control system is configured to determine power and/or energy consumption with the built-in power measurement of the drive unit which comprises at least one of: phase current and voltage measurement means of a 3-phase drive unit input; phase current measurement means of a 3-phase drive unit output supplying the motor and voltage measurement means of a drive unit intermediate DC circuit; phase current measurement means of a 3-phase drive unit output supplying the motor and voltage measurement means of a drive unit intermediate DC circuit and current measurement means of a drive unit output supplying the elevator control system.

In one embodiment of the invention the elevator control system is configured to determine and/or estimate the power and/or energy consumption in different operating states of the elevator based on a predefined component power demand in each operating state and the time spent in each operating state.

In one embodiment of the invention the operating states comprise at least one of the following: elevator moving, elevator door moving, elevator in idle, elevator in standby.

In one embodiment of the invention the elevator control system is configured to take into account energy and/or power consumption of at least one of the following components when determining energy and/or power consumption in different operating states of the elevator: energy and/or power consumption of the elevator control system, energy and/or power consumption of an elevator car light circuit, energy and/or power consumption of an elevator shaft light circuit, energy and/or power consumption of shaft signalization, energy and/or power consumption of a fan and/or an air conditioning system of the elevator car, energy and/or power consumption of a door operator, energy and/or power consumption of the drive system internal power, such as the power and/or energy consumption of the drive unit and a drive unit controller.

In one embodiment of the invention the power and/or energy consumption of the elevator is configured to be determined in the drive system, in the elevator control system, in a separate local computing device and/or in an external server or service, such as a cloud service.

According to a third aspect, the invention relates to an elevator comprising an elevator car, an elevator motor configured to move the elevator car, and an elevator control system according to the solution of the invention.

According to a fourth aspect, the invention relates to computer program comprising instructions which, when executed by a computer, cause the computer to carry out the method according to invention.

According to a fifth aspect, the invention relates to computer-readable medium comprising the computer program according to invention.

With the solution of the invention in which the existing voltage, current and/or power measurements of the drive unit are combined with an estimation or calculation of the elevator system power and/or energy consumption it is possible to further improve the power/energy consumption determination of the elevator system. The invention provides also benefits over the prior art solutions in the form of more cost-effective energy monitoring because there is no need for external and separate measuring equipment and their installation.

The expression “a number of” refers herein to any positive integer starting from one, e.g. to one, two, or three.

The expression “a plurality of” refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs “to comprise” and “to include” are used in this document as open limitations that neither exclude nor require the existence of unrecited features. The features recited in dependent claims are mutually freely combinable unless otherwise explicitly stated. Furthermore, it is to be understood that the use of “a” or “an”, i.e. a singular form, throughout this document does not exclude a plurality.

BRIEF DESCRIPTION OF THE FIGURES

The embodiments of the invention are illustrated by way of example, and not by way of limitation, in the figures of the accompanying drawings, in which.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Reference will now be made in detail to the embodiments of the present invention, examples of which are illustrated in the accompanying drawings.

Figure 1:
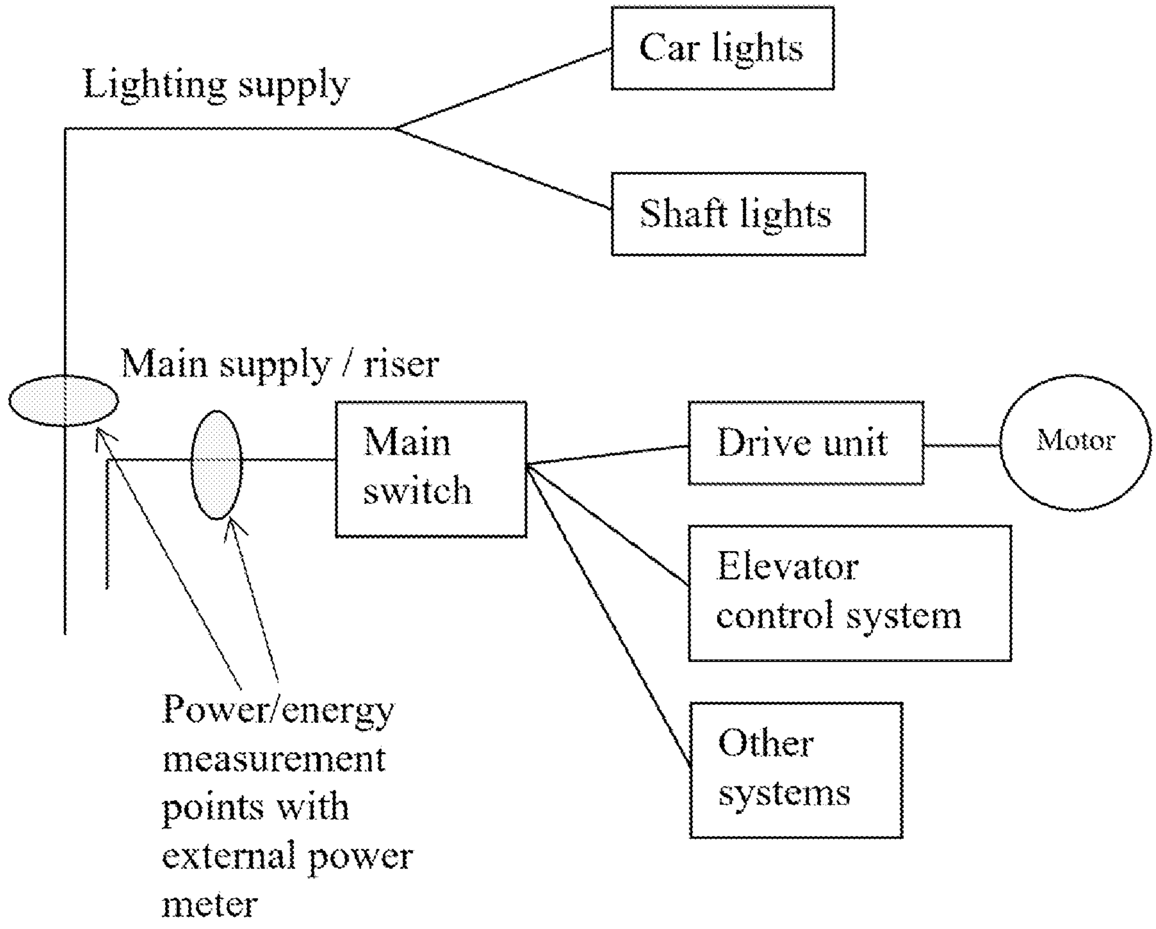
FIG. 1 illustrates an energy monitoring solution of the prior art.

FIG. 1 illustrates an energy monitoring solution of the prior art which is based on external power measurement devices. In the example of FIG. 1 energy and power consumption are measured with two separate external power meters. One power meter is configured to measure power and energy consumption of lighting supply including e.g. car lights and shaft lights. The second power meter is configured to measure power and energy consumption of the main supply/riser including consumption of e.g. drive unit, motor, control system and other systems.

There are some drawbacks in the prior art solution presented in FIG. 1. The solution has relatively high hardware, installation and configuration costs as for example the light supply needs own measurement device. Also, integration to elevator systems is difficult and requires time because there is a need to support several meter suppliers. The solution of FIG. 1 with multiple external power meters also requires long elevator downtime during meter installation and integration to the elevator system.

With the solution of the present invention the drawbacks of the prior art solutions, e.g. the solution presented in FIG. 1, can be avoided. With the solution of the present invention the existing voltage, current and/or power measurements of the drive unit are combined with an estimation or calculation of the elevator system power and/or energy consumption. In the solution of the present invention power and/or energy consumption of the drive system, e.g. drive unit, is measured and/or determined at least when the elevator is moving. Also, duration which the elevator spends in different operating states of the elevator is determined. The energy and/or power consumption of the elevator is determined based at least in part on the measured and/or determined power and/or energy consumption of the drive system and the determined and/or estimated energy and/or power consumption in different operating states of the elevator. The power and/or energy consumption of the elevator can be determined in the drive system, in elevator control system, in a separate local computing device and/or in an external server or service, such as a cloud service.

The built-in power measurement of the drive unit may comprise motor input power measurement and/or drive unit input power measurement and/or elevator control system input power measurement. In one embodiment of the invention the drive unit input power measurement comprises drive unit input phase voltage and current measurements. In one embodiment of the invention the motor input power measurement comprises dive unit intermediate DC circuit voltage measurement and drive unit motor output phase current measurements. In one embodiment of the invention the motor input power measurement comprises drive unit motor output phase current and voltage measurements. In one embodiment of the invention the elevator control system input power measurement comprises drive unit intermediate DC circuit voltage measurement and drive unit elevator control system output current measurements. In one embodiment of the invention the elevator control system input power measurement comprises drive unit elevator control system output current and voltage measurements. These voltage and current measurements are used to control the drive unit, e.g. with the drive unit controller, for driving the elevator motor. Based on these voltage and current measurements, that is drive unit control data, at least a part of power and energy consumption of the drive system may be calculated. This way the estimation of the power and/or energy consumption of the elevator can be improved by combining the predefined power demand of components in each operating state with already existing drive unit control data comprising measured power consumption of the drive system.

Figure 2A:
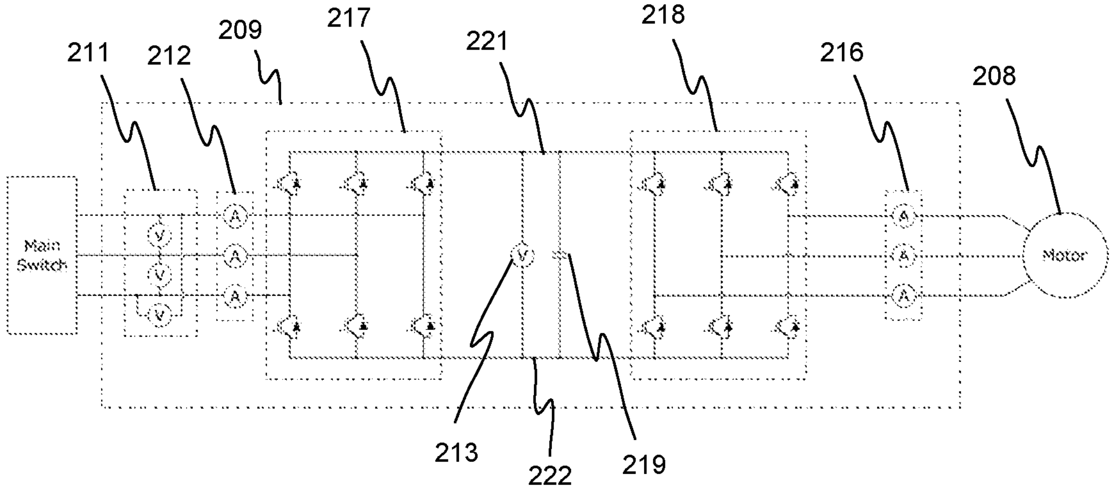
FIG. 2A presents an example embodiment of a drive unit with which the solution of the invention can be used.

FIG. 2A presents a drive unit according to one embodiment of the invention with which the invention may be used. In this embodiment the drive unit 209 comprises a rectifier 217, an intermediate DC circuit comprising positive DC circuit busbar 221 and negative DC circuit busbar 222 and an inverter 218. Further, a capacitor 219 is connected between the positive and negative DC circuit busbars 221, 222. The rectifier 217 and the inverter 218 comprise solid-state switches, e.g. MOSFETs or IGBTs, for converting power between AC and DC. However, in some other embodiments of the invention, the drive unit 209 may comprise a rectifier 217 comprising diodes instead of semiconductor switches. The input of the drive unit 209 is connected to the main switch and the drive unit motor output is connected to the motor 208.

Figure 2B:
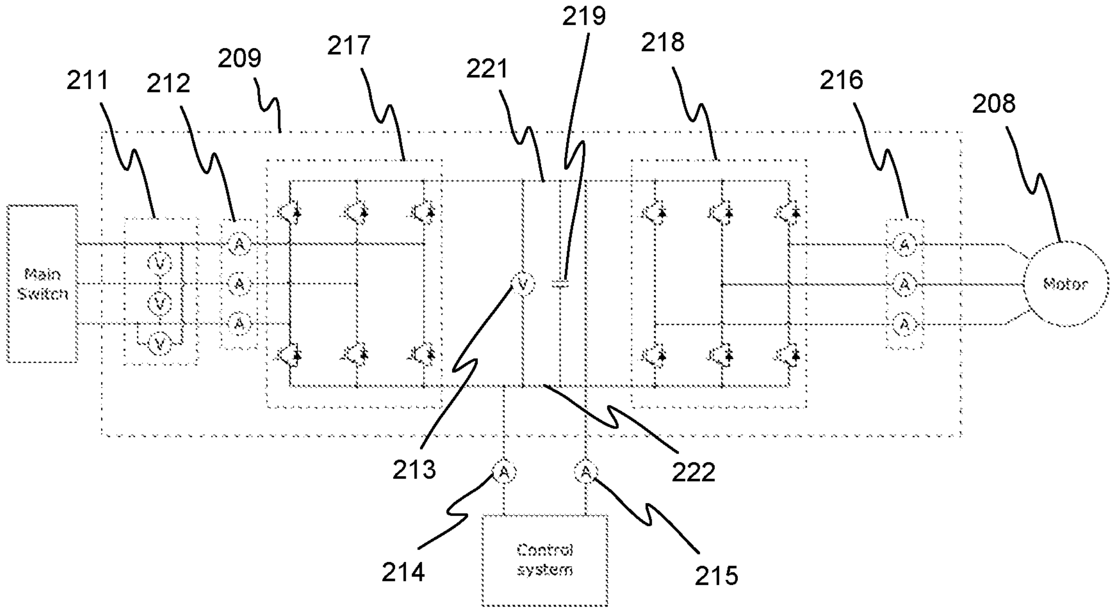
FIG. 2B presents an example embodiment of a drive unit with which the solution of the invention can be used.

FIG. 2B presents also a drive unit according to one embodiment of the invention with which the invention may be used. The solution presented in FIG. 2B is otherwise similar to the embodiment of 2A but in this embodiment the elevator control system is connected to a drive unit elevator control system output, which is connected to the positive and negative DC circuit busbars 221, 222 of the intermediate DC circuit, and the drive unit 209 supplies the elevator control system.

In one embodiment of the invention the drive unit 209 comprises voltage measurement means 211 for measuring the phase voltages of the drive unit input and current measurement means 212 for measuring the phase currents of the drive unit input as shown in FIG. 2A and FIG. 2B. The voltage measurement means 211 and the current measurement means 212 of the drive unit input may be used as the built-in power measurement of the drive unit input power.

In one embodiment of the invention the drive unit 209 may comprise voltage measurement means 213 for measuring the voltage between drive unit intermediate DC circuit positive and negative busbars 221, 222 as shown in FIG. 2A and FIG. 2B. Also, the drive unit 209 may comprise current measurement means 216 for measuring phase currents of the drive unit motor output. The voltage measurement means 213 of the drive unit intermediate DC circuit and the current measurement means 216 of the drive unit motor output may be used as the built-in power measurement of the motor input power.

In one embodiment of the invention the drive unit 209 may comprise voltage measurement means for measuring the phase voltages of the drive unit motor output and current measurement means 216 for measuring phase currents of the drive unit motor output. These phase voltage measurement means and current measurement means 216 of the drive unit motor output may be used as the built-in power measurement of the motor input power.

In one embodiment of the invention the drive unit 209 may comprise voltage measurement means 213 for measuring the voltage between drive unit intermediate DC circuit positive and negative busbars 221, 222. Also, the drive unit 209 may comprise current measurement means 214, 215 for measuring currents of the drive unit elevator control system output as shown in FIG. 2B. The voltage measurement means 213 of the drive unit intermediate DC circuit and the current measurement means 214, 215 of the drive unit elevator control system output may be used as the built-in power measurement of the elevator control system input power. Either one or both of the current measurement means 214, 215 of the drive unit elevator control system output may be used for the built-in power measurement of the elevator control system input power. In case only one of the current measurement means 214, 215 is used, the drive unit may not comprise the other.

In one embodiment of the invention the drive unit 209 may comprise voltage measurement means for measuring the voltage of the drive unit elevator control system output. Also, the drive unit 209 may comprise current measurement means 214, 215 for measuring currents of the drive unit elevator control system output. These voltage measurement means and current measurement means 214, 215 of the drive unit elevator control system output may be used as the built-in power measurement of the elevator control system input power. Either one or both of the current measurement means 214, 215 of the drive unit elevator control system output may be used for the built-in power measurement of the elevator control system input power. In case only one of the current measurement means 214, 215 is used, the drive unit may not comprise the other.

In one embodiment of the invention the power and/or energy consumption in different operating states of the elevator is determined and/or estimated based on a component power demand in each operating state and the time spent in each operating state. The operating states can comprise at least one of the following: elevator moving, elevator door moving, elevator in idle, elevator in standby. Energy and/or power consumption of at least one of the following components can be taken into account when determining energy and/or power consumption in different operating states of the elevator: energy and/or power consumption of an elevator control system, energy and/or power consumption of an elevator car light circuit, energy and/or power consumption of an elevator shaft light circuit, energy and/or power consumption of shaft signalization, energy and/or power consumption of a fan and/or an air conditioning system of the elevator car, energy and/or power consumption of a door operator of the elevator car, energy and/or power consumption of the drive system internal power, such as the power and/or energy consumption of the drive unit and the drive unit controller. Preferably the shaft signalization may comprise destination operating panels at landing floors, electrification and cabling at landing floors, electrification and cabling between the landing floors and elevator control system, elevator car operating panel and elevator car electrification and cabling.

In one embodiment of the invention, the internal power for the drive system is supplied from the drive unit input or from the intermediate DC circuit of the drive unit. In this case the built-in power measurement covers also the internal power.

In one embodiment the power and/or energy consumption of the drive system may be determined based on a predefined drive system power demand in each operating state and the time spent in each operating state when the elevator is not moving i.e. the elevator is in an idle, standby or elevator door moving operating state. This embodiment provides an advantage that the built-in power measurements of the drive unit are not performed when these built-in power measurements are not needed to drive the electric motor, e.g. by the drive unit controller, and the drive unit or the drive system may be set to an idle or deep power saving mode. The predefined power and/or energy demand corresponds to actual power and/or energy consumption more accurately in these modes and this results in reduced power and/or energy consumption. The determination of the energy and/or power consumption of the elevator may be done, e.g. in the elevator control system, a separate local computing device, external server or service, based on a predefined power demand of the drive system and determined and/or estimated energy consumption in different operating states of the elevator in each operating state when the elevator is at a standstill.

In another embodiment, the power and/or energy consumption of the drive system may be determined based on measured power and/or energy consumption also when the elevator is not moving i.e. also when the elevator is in an idle, standby or elevator door moving operating state. This embodiment provides an advantage of more precise power and/or energy consumption determination.

Solutions according to different embodiments of the invention are explained in more detail below. In these example embodiments the drive unit measures power and/or energy consumption when the elevator is moving. In addition to the drive unit, the elevator control system also has information about the elevator operating states and can calculate time that elevator spends in each state. Rest of the power and energy consumption within the elevator system can be calculated and determined based on the known components present at a specific elevator and component power or energy demand in each operating state multiplied by the time spent in that operating state.

The states in one embodiment of the invention can be for example running, door moving, idle, first standby (e.g. 5 min), second standby (e.g. 30 min). Total power consumption can be determined or calculated for example on-site in elevator drive system, on-site in elevator control system, on-site in a separate local device and/or off-site in a remote service or server such as a cloud service.

The determined energy and power consumption data can be utilized for example by the elevator system or external system such as building energy management systems and/or an external server or service, such as a cloud service. The determined energy and power consumption data can be provided to the user devices e.g. via these systems.

Figure 3A:
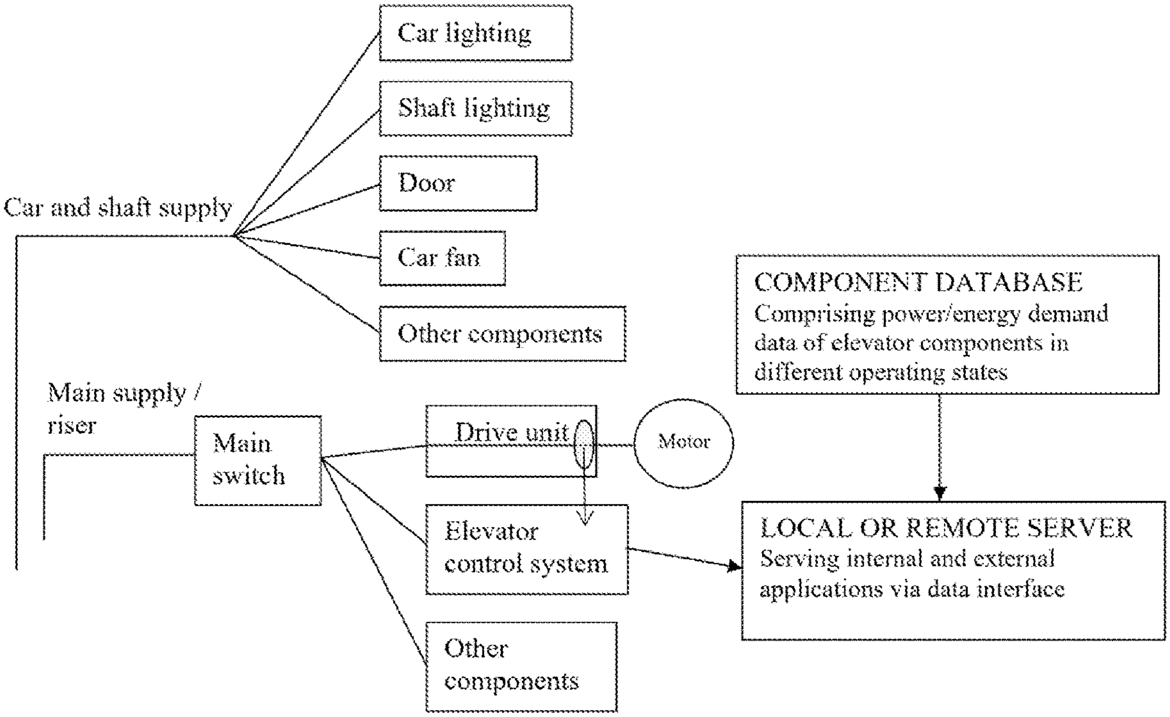
FIG. 3A illustrates an energy monitoring solution according to one embodiment of the invention.

FIG. 3A illustrates an energy monitoring solution according to one embodiment of the invention. In this embodiment the built-in power measurement of the drive unit is carried out on the motor side. The built-in power measurement of the drive unit can comprise phase current measurements of a 3-phase drive unit output supplying the motor and voltage measurement of the drive unit intermediate DC circuit. In the embodiment of FIG. 3A the drive system measures motor input power and/or energy. Motor input power is measured inside the drive unit. Power and/or energy consumption of other components, such as elevator car light circuit, elevator shaft light circuit, shaft signalization, elevator car fan, elevator car air conditioning system, door operator, elevator control system, drive electronics and other components, can be calculated. Time spent in each operating state of the elevator is recorded in the elevator control system. The elevator total power and/or energy consumption is determined or calculated based on the above-mentioned inputs, i.e. the combination of power measurements and determined or calculated power of other components in different elevator operating states.

The system of FIG. 3A also comprises a component database comprising data of power demand of different elevator components in different operating states and a local or off-site server serving internal and external applications via data interface such as Open Platform Communications (OPC) or Message Queuing Telemetry Transport (MQTT). A power and/or energy demand value or parameter of a specific component in different operating state can be stored in the database. In one embodiment of the invention the component power and/or energy demand value or parameter can be adjustable. This way power and/or energy consumption determination precision can be later improved during remote software updates and/or elevator on-site maintenance visits.

The drive system used in the solution of the invention may comprise a main switch, a filter, such as an LCL filter, a drive unit, such as an AC/AC frequency converter, a drive unit controller, sensing devices such as voltage and current measurement means and motor encoder, and an electric motor.

Figure 3B:
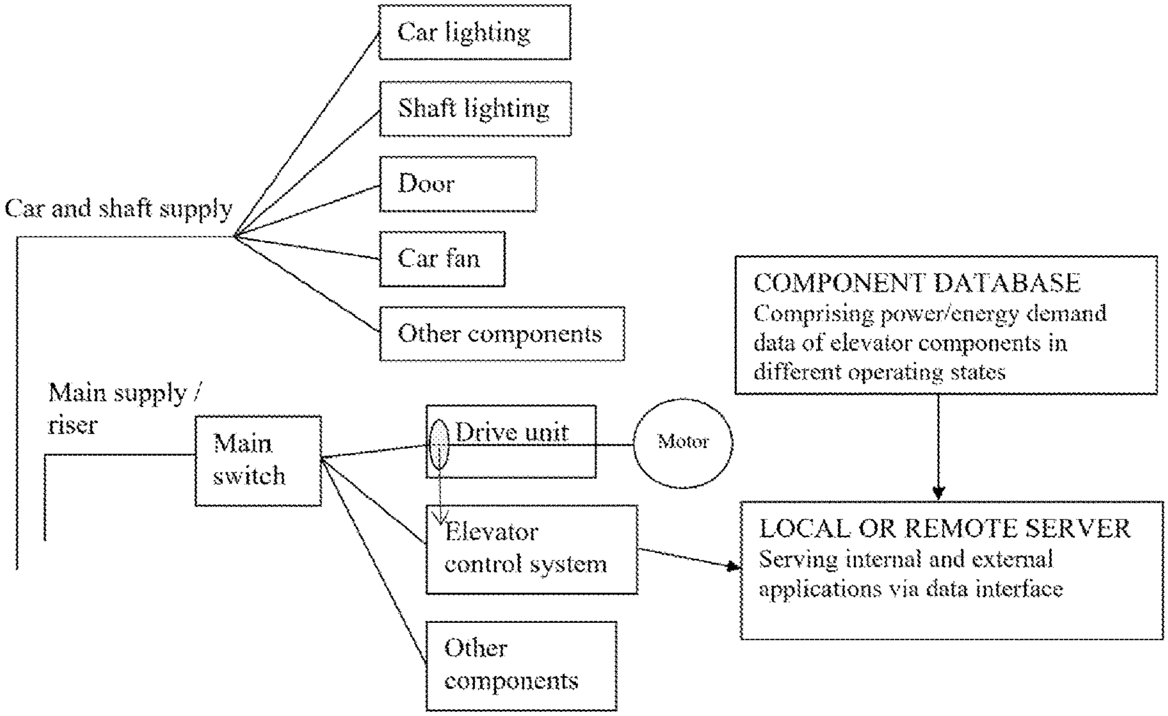
FIG. 3B illustrates an energy monitoring solution according to one embodiment of the invention.

FIG. 3B illustrates an energy monitoring solution according to one embodiment of the invention. This solution is otherwise similar to the embodiment presented in FIG. 3A but in this embodiment the built-in power measurement of the drive unit is carried on the drive unit input side. Thus, the drive unit input power is measured inside the drive unit. The built-in power measurement of the drive unit can comprise phase current and voltage measurements of a 3-phase mains of the drive unit input. Power and/or energy consumption of elevator control system, drive electronics and other components, such as elevator car light circuit, elevator shaft light circuit, shaft signalization, elevator car fan, elevator car air conditioning system, door operator etc., is calculated. Time spent in each operating state of elevator is recorded in the elevator control system and elevator total power and/or energy consumption is calculated based on above mentioned inputs.

Figure 3C:
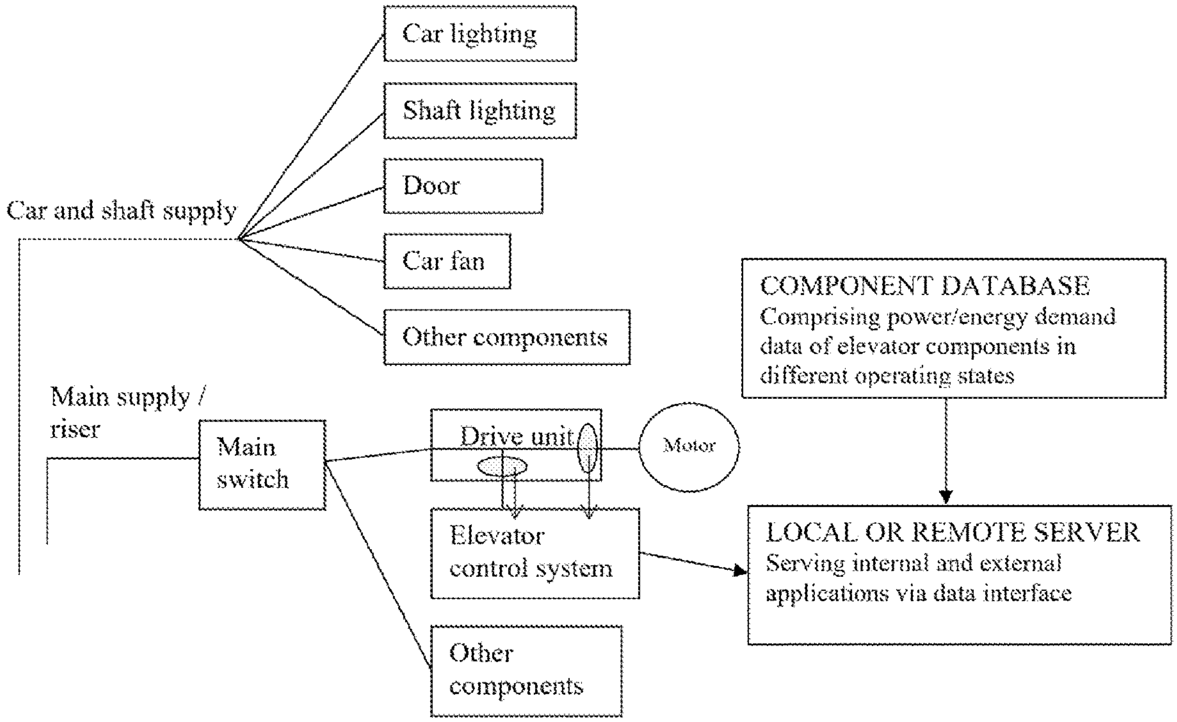
FIG. 3C illustrates an energy monitoring solution according to one embodiment of the invention.

FIG. 3C illustrates an energy monitoring solution according to one embodiment of the invention. This solution is otherwise similar to the embodiments presented in FIGS. 3A and 3B but in this embodiment power supply to the elevator control system is provided by the drive and the drive unit built-in power measurement for motor input power and elevator control system power supply are used in determining the energy and/or power consumption. The drive unit measures motor input power and elevator control system power supply. Motor input power and elevator control system power supply is measured inside the drive unit. Energy and/or power consumption of all other components, such as elevator car light circuit, elevator shaft light circuit, shaft signalization, elevator car fan, elevator car air conditioning system, door operator, drive electronics and other components, is calculated. The built-in power measurement of the drive unit can comprise phase current measurements of a 3-phase drive unit output supplying the motor, voltage measurement of the drive unit intermediate DC circuit and current and/or voltage measurements of a drive unit output supplying elevator control system. As with the previous embodiments time spent in each operating state of the elevator is recorded in control system and elevator total power and/or energy consumption is calculated based on above mentioned inputs, i.e. the combination of power measurements and determined or calculated power of other components in different elevator operating states.

Figure 3D:
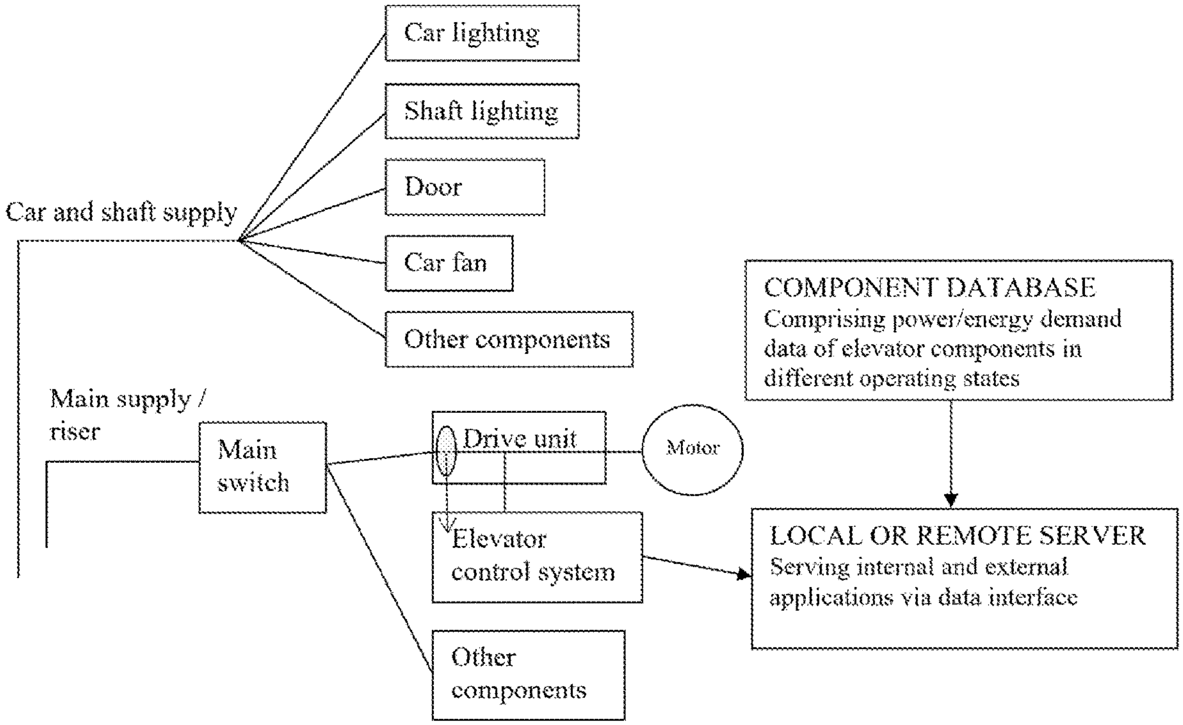
FIG. 3D illustrates an energy monitoring solution according to one embodiment of the invention.

FIG. 3D illustrates an energy monitoring solution according to one embodiment of the invention. This solution is otherwise similar to the embodiment presented in FIG. 3C but in this embodiment the drive unit built-in power measurement is carried out on the drive unit input side. Drive unit input power is measured inside drive unit including drive electronics and elevator control system. The drive unit measures drive unit input power and energy and/or power consumption of all other components, such as elevator car light supply, elevator shaft light supply, shaft signalization, elevator car fan, elevator car air conditioning system and door operator, is calculated. The built-in power measurement of the drive unit can comprise phase current and voltage measurements of a 3-phase mains of the drive unit input. Also, in this example embodiment time spent in each operating state of the elevator is recorded in elevator control system and elevator total power and/or energy consumption is calculated based on above mentioned inputs, i.e. the combination of power measurements and determined or calculated power of other components in different elevator operating states.

In one embodiment of the invention the elevator control system may comprise a single elevator controller. In one embodiment of the invention the elevator control system may comprise an elevator group controller controlling multiple elevators or single elevator controllers.

Figure 4:
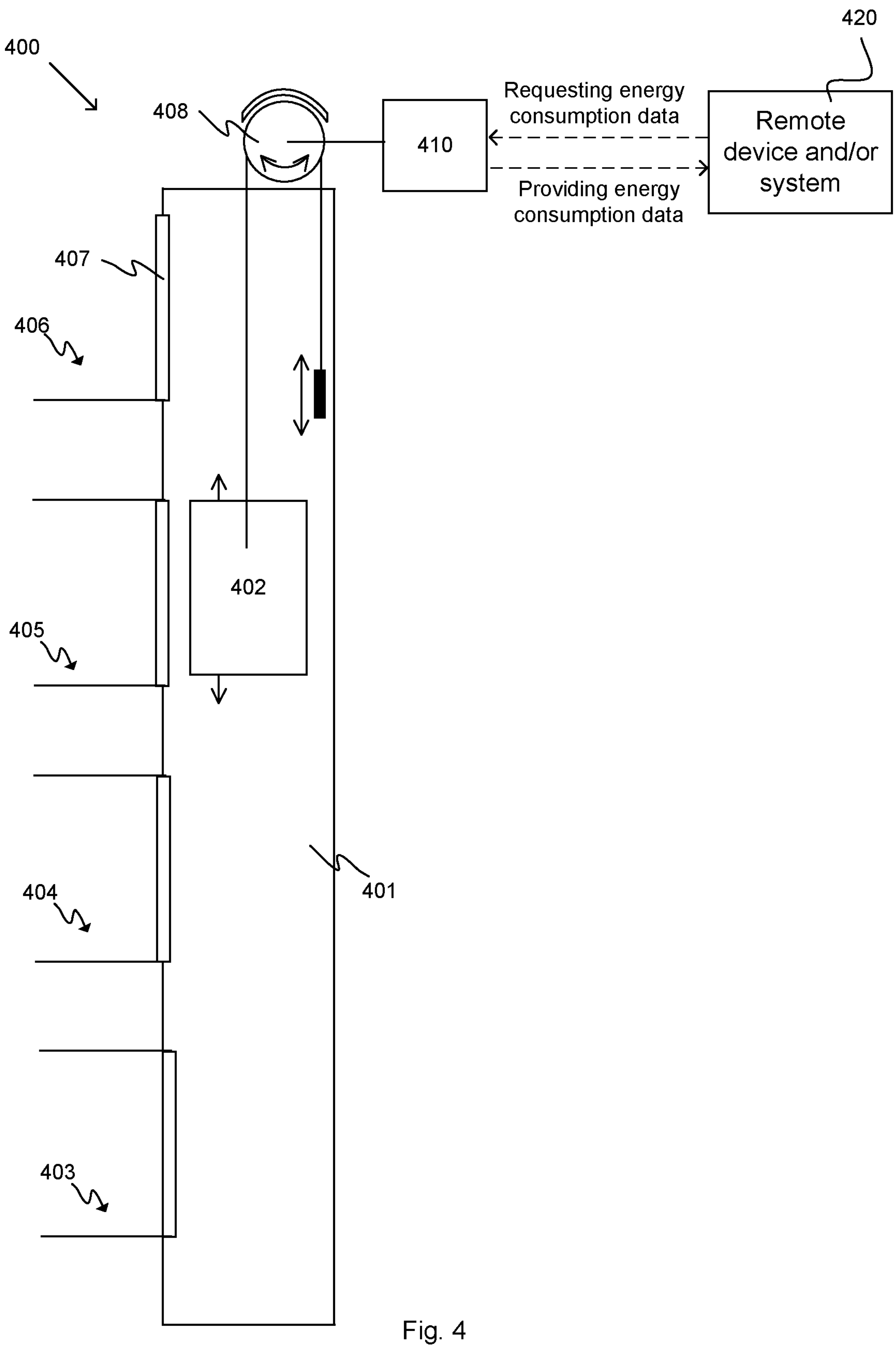
FIG. 4 presents an example embodiment of an elevator in which the solution of the invention can be used.

FIG. 4 illustrates an elevator system 400 according to one example embodiment of the invention in which the solution of the invention can be used. The elevator system comprises an elevator shaft 401 in which an elevator car 402 moves to serve different floors. In FIG. 4 only one type of elevator system is illustrated and described but the solution of the invention can be used for different kinds of elevators than what is described relating to FIG. 4. Although FIG. 4 illustrates four floors 403, 404, 405, 406, there may be any number of floors. Similarly, although FIG. 4 illustrates only one elevator shaft 401, there may be more than one elevator shaft in the elevator system. In the elevator system 400 illustrated in FIG. 4, there is one side towards which landing doors 407 at each floor can be opened. Although FIG. 4 illustrates one side, in another embodiment it is possible that the elevator car has doors towards more than one side of the elevator car 402.

The elevator car 402 is configured to perform a travel in the elevator shaft 401, wherein the elevator car is moved in this example by a motor 408 which can be controlled by a drive unit such as a frequency converter. The term "travel" may refer to a process where the elevator car 402 may be configured to move in the elevator shaft 401 so that each floor is passed or visited at least once, i.e. the elevator car 402 can perform an end-to-end travel. In another embodiment, the travel in the elevator shaft 401 may not be a complete end-to-end travel. For example, it may not be possible to travel to one or more of the floors, for example, to the uppermost or the lowermost floor. The elevator system can comprise a controller 410 configured to control the movement of the elevator, and e.g. the motor. The controller 410 may be also configured to determine the energy and or power consumption of the elevator according to the solution of the invention. The controller 410 may comprise drive unit and drive unit controller. In one embodiment of the invention it comprises also the elevator control system. The elevator and e.g. its controller can provide energy and/or power consumption data to desired devices and units, e.g. to a remote device and/or system 420. The remote system can in one embodiment of the invention request energy consumption data.

Figure 5:
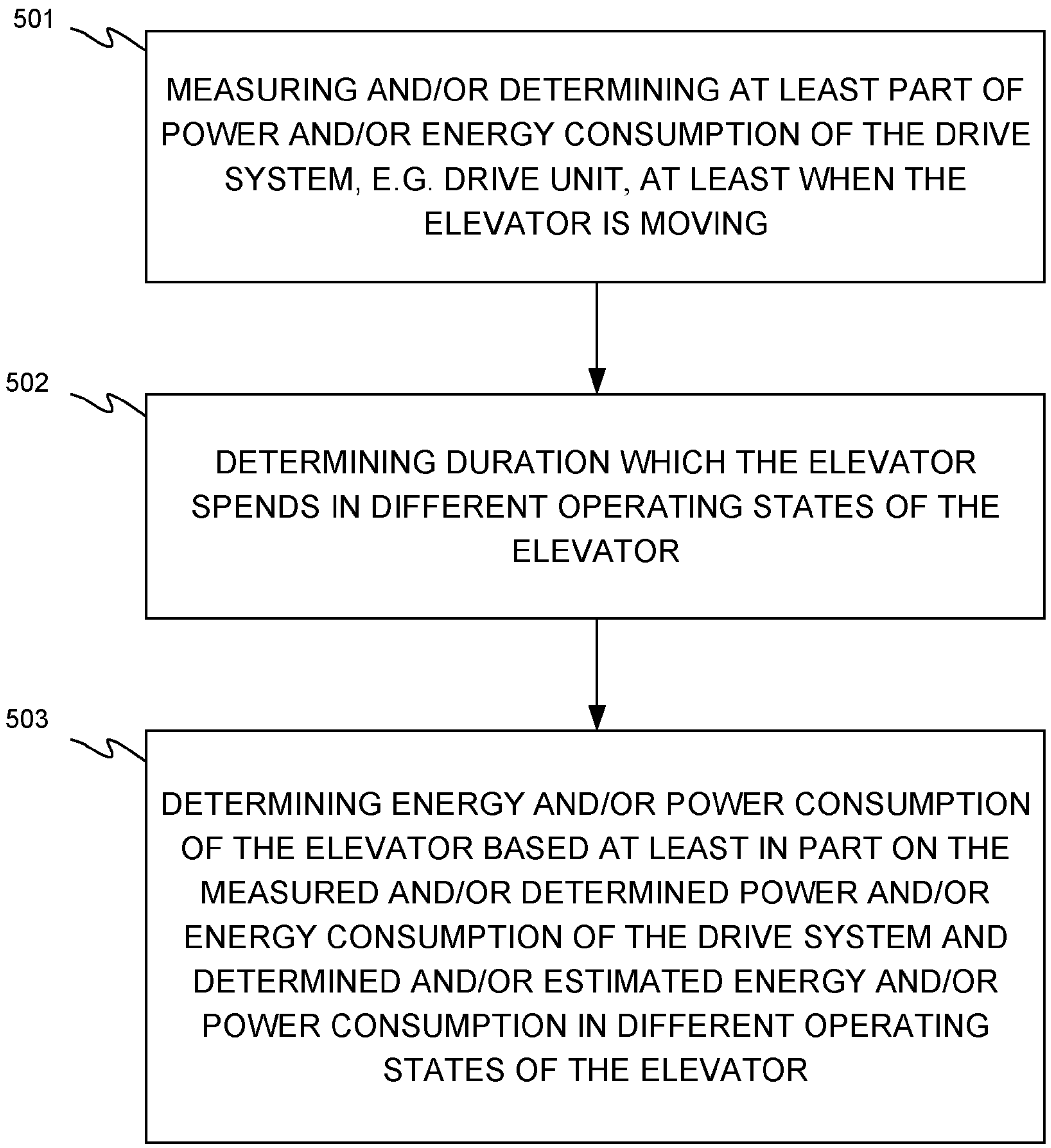
FIG. 5 presents a flow chart illustrating a method according to one embodiment of the invention.

FIG. 5 presents a flow chart illustrating a method according to one embodiment of the invention. In the step 501 of the method presented in FIG. 5 power and/or energy consumption of the drive system, e.g. drive unit, is measured and/or determined at least when the elevator is moving. In the step 502 duration which the elevator spends in different operating states of the elevator is determined. In the step 503 energy and/or power consumption of the elevator is determined based at least in part on the measured and/or determined power and/or energy consumption of the drive system and the determined and/or estimated energy and/or power consumption in different operating states of the elevator.

A control unit or other unit, which can be used in one embodiment of the invention, such as a controller of an elevator system, may comprise at least one processor connected to at least one memory. The at least one memory may comprise at least one computer program which, when executed by the processor or processors, causes the controller to perform the programmed functionality. In another embodiment, the at least one memory may be an internal memory of the at least one processor. The controller may also comprise an input/output interface. Via the input/output interface, the control apparatus may be connected to at least one wireless device. The controller may be a control entity configured to implement only the above disclosed operating features, or it may be part of a larger elevator control entity, for example, an elevator controller or an elevator group controller.

The solution of the invention can utilize different kind of wireless technologies in data transfer and communication between units and devices, such as cellular network communication, LAN, WLAN, wireless sensor network, e.g. Bluetooth, Zigbee, etc. In a case where multiple different communication methods are used, the elevator system can be connected, e.g. the controller can be connected, to different communication units of different communication methods. These communication methods can be utilized e.g. for the communication between the units of the elevator system and/or external servers or services for example for transferring of parameters, adjustable values, status information about the operating mode of the elevator and determined elevator power and energy consumption data.

The components or other parts of the exemplary embodiments can include computer readable medium or memories for holding instructions programmed according to the teachings of the present embodiments and for holding data structures, tables, records, and/or other data described herein. Computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD1RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge or any other suitable medium from which a computer can read.

The embodiments of the invention described hereinbefore in association with the figures presented and the summary of the invention may be used in any combination with each other. At least two of the embodiments may be combined together to form a further embodiment of the invention.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A method for determining energy and/or power consumption of an elevator comprising:
- providing a circuit as a drive unit for driving an electric motor of the elevator, wherein the provided circuit is formed of
  - a three-phase solid-state rectifier equipped with built-in voltage and current sensors to respectively measure the phase input voltages and phase input currents of the rectifier,
  - an intermediate DC circuit comprising a positive DC circuit busbar and a negative DC circuit busbar, with a capacitor connecting the positive DC circuit busbar and the negative DC circuit busbar, the intermediate DC circuit being equipped with a built-in voltage sensor to measure the voltage between the positive and negative DC circuit busbars, and
  - a three-phase solid-state inverter connected to the output of the rectifier via the positive and negative DC circuit busbars, the inverter being equipped with built-in current sensors to measure the phase currents output from the inverter to the electric motor;
- controlling the drive unit to cause the elevator to move and, while the elevator is moving,
  - collecting the phase voltage measurements and the phase current measurements from the built-in volage and current sensors of the rectifier,
  - collecting the voltage measurements from the built-in voltage sensor of the intermediate DC circuit,
  - collecting the phase current measurements from the built-in current sensors of the inverter, and
- combining the collected measurements into a measured power and/or energy consumption of the drive system when the elevator is moving,
- determining duration which the elevator spends in different operating states of the elevator,
- determining energy and/or power consumption of the elevator based at least in part on the measured power and/or energy consumption of the drive system, and a determination of an amount of power and/or energy that is consumed by the elevator in each of the different operating states, and
- transmitting, via a network or wireless communications, data of said determined energy and/or power consumption to at least one of a building energy management system and an external computing device programmed to monitor energy consumption of the elevator.

2. A method according to claim 1, wherein the power and/or energy consumption in different operating states of the elevator is determined and/or estimated based on a predefined component power demand in each operating state and the time spent in each operating state.

3. A method according to claim 1, wherein the operating states comprise at least one of the following: elevator moving, elevator door moving, elevator in idle, elevator in standby.

4. A method according to claim 1, wherein energy and/or power consumption of at least one of the following components is taken into account when determining energy and/or power consumption in different operating states of the elevator: energy and/or power consumption of the elevator control system, energy and/or power consumption of an elevator car light circuit, energy and/or power consumption of an elevator shaft light circuit, energy and/or power consumption of shaft signalization, energy and/or power consumption of a fan and/or an air conditioning system of the elevator car, energy and/or power consumption of a door operator, energy and/or power consumption of the drive system internal power.

5. A method according to claim 1, wherein the power and/or energy consumption of the elevator is determined in the drive system and/or in the elevator control system and/or in a separate local computing device and/or in an external server or service.

6. Elevator control system comprising:
- a drive system comprising, as a drive unit for driving an electric motor of an elevator, a circuit formed of
  - a three-phase solid-state rectifier equipped with built-in voltage and current sensors to respectively measure the phase input voltages and phase input currents of the rectifier,
  - an intermediate DC circuit comprising a positive DC circuit busbar and a negative DC circuit busbar, with a capacitor connecting the positive DC circuit busbar and the negative DC circuit busbar, the intermediate DC circuit being equipped with a built-in voltage sensor to measure the voltage between the positive and negative DC circuit busbars, and a three-phase solid-state inverter connected to the output of the rectifier via the positive and negative DC circuit busbars, the inverter being equipped with built-in current sensors to measure the phase currents output from the inverter to the electric motor; and at least one processor configured to execute instructions stored in at least one memory, wherein the elevator control system is configured to use at least two different operating states for the elevator, and wherein, based on the executed instructions, the processor is configured to:

while the drive unit causes the elevator to move, collect the phase voltage measurements and the phase current measurements from the built-in volage and current sensors of the rectifier, collect the voltage measurements from the built-in voltage sensor of the intermediate DC circuit, and collect the phase current measurements from the built-in current sensors of the inverter;

combine the collected measurements into a measured power and/or energy consumption of the drive system when the elevator is moving;

determine duration which the elevator spends in each operating state of the elevator, determine energy and/or power consumption of the elevator based at least in part on the measured power and/or energy consumption of the drive system, and a determination of an amount of power and/or energy that is consumed by the elevator while operating in each of the different operating states; and transmit, via a network or wireless communications, data of said determined energy and/or power consumption to at least one of a building energy management system and an external computing device programmed to monitor energy consumption of the elevator.

7. An elevator control system according to claim 6, wherein, based on the executed instructions, the processor elevator control system is configured to determine and/or estimate the power and/or energy consumption in different operating states of the elevator based on a predefined component power demand in each operating state and the time spent in each operating state.

8. An elevator control system according to claim 6, wherein the operating states comprise at least one of the following: elevator moving, elevator door moving, elevator in idle, elevator in standby.

9. An elevator control system according to claim 6, wherein, based on the executed instructions, the processor is configured to take into account energy and/or power consumption of at least one of the following components when determining energy and/or power consumption in different operating states of the elevator: energy and/or power consumption of the elevator control system, energy and/or power consumption of an elevator car light circuit, energy and/or power consumption of an elevator shaft light circuit, energy and/or power consumption of shaft signalization, energy and/or power consumption of a fan and/or an air conditioning system of the elevator car, energy and/or power consumption of a door operator, energy and/or power consumption of the drive system internal power.

10. An elevator control system according to claim 6, wherein the processor and memory are configured to be determined in the drive system, in the elevator control system, in a separate local computing device and/or in an external server or service.

11. An elevator comprising an elevator car, an elevator motor configured to move the elevator car, a drive system for driving the elevator motor, an elevator control system configured to control the elevator and/or the drive system, wherein the elevator control system is an elevator control system according to claim 6.

12. A non-transitory computer program comprising instructions which, when executed by a computer, cause the computer to carry out the method according to claim 1.

13. A non-transitory computer-readable medium comprising the computer program according to claim 12.

14. A method according to claim 4, wherein the power and/or energy consumption in different operating states of the elevator is determined and/or estimated based on a predefined component power demand in each operating state and the time spent in each operating state.

15. A method according to claim 5, wherein the power and/or energy consumption in different operating states of the elevator is determined and/or estimated based on a predefined component power demand in each operating state and the time spent in each operating state.

16. A method according to claim 4, wherein the operating states comprise at least one of the following: elevator moving, elevator door moving, elevator in idle, elevator in standby.

* * * * *